(12) United States Patent
Moudy

(10) Patent No.: US 11,748,698 B2
(45) Date of Patent: Sep. 5, 2023

(54) SYSTEM AND METHOD FOR SECURE DELIVERY SYSTEM

(71) Applicant: Christopher Moudy, Costa Mesa, CA (US)

(72) Inventor: Christopher Moudy, Costa Mesa, CA (US)

(*) Notice: Subject to any disclaimer, the term of this patent is extended or adjusted under 35 U.S.C. 154(b) by 115 days.

(21) Appl. No.: 17/520,904

(22) Filed: Nov. 8, 2021

(65) Prior Publication Data

US 2022/0058575 A1    Feb. 24, 2022

Related U.S. Application Data

(63) Continuation-in-part of application No. 16/157,479, filed on Oct. 11, 2018, now abandoned, which is a continuation-in-part of application No. 14/849,155, filed on Sep. 9, 2015, now abandoned, which is a continuation-in-part of application No. 13/402,805, filed on Feb. 22, 2012, now abandoned, which is a continuation-in-part of application No. 12/379,771, filed on Feb. 27, 2009, now abandoned, which is a continuation-in-part of application No. 11/004,075, filed on Dec. 6, 2004, now abandoned.

(51) Int. Cl.
| | |
|---|---|
| *G06Q 10/0836* | (2023.01) |
| *G07C 9/00* | (2020.01) |
| *A47G 29/14* | (2006.01) |
| *H04L 67/12* | (2022.01) |
| *A47G 29/20* | (2006.01) |

(52) U.S. Cl.
CPC ....... *G06Q 10/0836* (2013.01); *A47G 29/141* (2013.01); *A47G 29/20* (2013.01); *G07C 9/00182* (2013.01); *H04L 67/12* (2013.01); *A47G 2029/142* (2013.01); *A47G 2029/147* (2013.01); *G05B 2219/50333* (2013.01)

(58) Field of Classification Search
None
See application file for complete search history.

(56) References Cited

U.S. PATENT DOCUMENTS

| | | |
|---|---|---|
| 6,264,104 B1 | 7/2001 | Jenkins et al. |
| 6,300,873 B1 | 10/2001 | Kucharczyk et al. |
| 6,323,782 B1 | 11/2001 | Stephens et al. |
| 6,408,243 B1 | 6/2002 | Yofu |
| 6,967,575 B1 | 11/2005 | Dohrmann et al. |
| 7,191,142 B1 | 3/2007 | Sandell et al. |
| 7,538,681 B1 | 5/2009 | Sharma et al. |

(Continued)

*Primary Examiner* — Carlos Garcia
(74) *Attorney, Agent, or Firm* — Noblitt & Newson, PLLC

(57) ABSTRACT

A secure delivery system according to various aspects of the present technology comprises a transport box having a storage space, an environmental control unit, a plurality of electrical contacts, and a deployable receiving tray responsive to automated delivery systems. The transport box fits within an interior space of a delivery box having a GPS receiver that provides a geographic delivery location of the delivery box. The delivery box comprises a plurality of corresponding electrical contacts configured to be coupled to the electrical contacts of the transport box to provide power to the transport box. The delivery box may further comprise an electronic lock that is responsive to a delivery box controller circuit configured to operate the electronic lock.

12 Claims, 17 Drawing Sheets

(56) References Cited

U.S. PATENT DOCUMENTS

| | | |
|---|---|---|
| 2001/0045449 A1 | 11/2001 | Shannon |
| 2002/0032613 A1 | 3/2002 | Buettgenbach et al. |
| 2002/0038266 A1 | 3/2002 | Tuttrup et al. |
| 2002/0040564 A1 | 4/2002 | Killingbeck et al. |
| 2002/0046173 A1 | 4/2002 | Kelly |
| 2002/0099567 A1 | 7/2002 | Joao |
| 2002/0147919 A1 | 10/2002 | Gentry |
| 2002/0156645 A1 | 10/2002 | Hansen |
| 2002/0169628 A1 | 11/2002 | Bauer |
| 2003/0014994 A1 | 1/2003 | Smith et al. |
| 2003/0085215 A1 | 5/2003 | Rix |
| 2003/0115104 A1 | 6/2003 | Smith et al. |
| 2003/0121968 A1 | 7/2003 | Miller et al. |
| 2003/0154891 A1 | 8/2003 | Fassbender et al. |
| 2003/0208415 A1 | 11/2003 | Sano et al. |
| 2004/0041706 A1* | 3/2004 | Stratmoen ............ G06Q 10/08 340/539.26 |
| 2004/0073449 A1 | 4/2004 | Yang |
| 2004/0088224 A1 | 5/2004 | Mukai |
| 2004/0117196 A1 | 6/2004 | Brockman et al. |
| 2004/0122780 A1 | 6/2004 | Devar |
| 2004/0149822 A1 | 8/2004 | Stevens et al. |
| 2004/0236635 A1 | 11/2004 | Publicover |
| 2004/0257225 A1* | 12/2004 | Webb, Sr. ............ G08B 25/00 340/539.26 |
| 2004/0263029 A1 | 12/2004 | Scholefield |
| 2005/0029149 A1 | 2/2005 | Leung et al. |
| 2005/0061877 A1 | 3/2005 | Stevens |
| 2013/0166400 A1 | 6/2013 | Nguyen et al. |

\* cited by examiner

SYSTEM AND METHOD FOR SECURE DELIVERY SYSTEM

CROSS-REFERENCES TO RELATED APPLICATIONS

This application is a continuation-in-part of U.S. patent application Ser. No. 16/157,479, filed Oct. 11, 2018, which is a continuation-in-part of U.S. patent application Ser. No. 14/849,155, filed Sep. 9, 2015, which is a continuation-in-part of U.S. patent application Ser. No. 13/402,805, filed Feb. 22, 2012, which is a continuation-in-part of application of U.S. application Ser. No. 12/379,771 filed Feb. 27, 2009, which is a continuation-in-part of application of U.S. application Ser. No. 11/004,075 filed Dec. 6, 2004 and incorporates the disclosure of each application in its entirety by reference. To the extent that the present disclosure conflicts with any referenced application, however, the present disclosure is to be given priority.

BACKGROUND OF INVENTION

The Internet has opened a vast electronic frontier for consumers, enabling the consumers to shop, from the convenience and comfort of their own home or business, among countless providers of all types of goods. Electronic commerce, merged with the Internet and the World Wide Web, facilitates the purchase of goods by integrating a variety of payment services so that, after browsing the web and browsing merchant websites, goods may be purchased essentially with the click of a button.

Once an order for goods has been placed with an Internet merchant, the goods of course must be delivered to the customer. While conventional forms of delivery, including the U.S. mail, express and overnight delivery services and other forms of mail and package delivery, and other common delivery and shipping methods and services, suffice for many items ordered on the Internet, some items require special handling for proper delivery. Food or other perishable items may require special care, such as maintenance of proper temperatures during delivery and after delivery if the food items delivered are left unattended. High value items may require special handling for security, or will require insurance against the loss or theft of the items during the course of delivery. The lack of a delivery service specialized to accommodate special handling for some goods may discourage a vibrant Internet marketplace for the goods if customers are concerned about receiving goods in good condition (such as frozen food items that may arrive thawed) or if Internet merchants or their customers must bear excessive costs to insure goods for delivery.

Additionally, delivery of some goods is hampered if the recipient is not present to receive the goods, since shippers, merchants, and customers may be reluctant to have certain goods left unattended. In addition, the rise in the occurrence of thefts of packages left at residential doorsteps creates even more uncertainty among consumers and merchants. The use of drone technology to deliver packages is likely to further exacerbate this condition since drones used to deliver packages will likely be programmed to deliver packages to a designated location without regard for whether the recipient is present or not. In addition, sometimes relayed drone exchanges during longer distance deliveries may require code exchanging security.

Various receptacles have been employed to receive delivered goods. A locked mailbox, for example, with a delivery slot that allows letters or very small packages to be inserted into the mailbox, and only removed by a recipient with a key. This provides a degree of security for the letters and small packages, but does not prevent receipt of unwanted items. Additionally, provision for maintaining an environmental condition is lacking. Larger lock boxes have been devised to overcome package size limitations. However, no known lock box addresses all phases of delivery of goods to provide security and proper handling of goods with special needs. Further, delivery boxes that can meet these needs and accommodate drone technology is lacking. Thus, a system and method for delivery of goods solving the aforementioned problems is desired.

SUMMARY OF THE INVENTION

A secure delivery system according to various aspects of the present technology comprises a transport box having a storage space, an environmental control unit, a plurality of electrical contacts, and a deployable receiving tray responsive to automated delivery systems. The transport box fits within an interior space of a delivery box having a GPS receiver that provides a geographic delivery location of the delivery box. The delivery box comprises a plurality of corresponding electrical contacts configured to be coupled to the electrical contacts of the transport box to provide power to the transport box. The delivery box may further comprise an electronic lock that is responsive to a delivery box controller circuit configured to operate the electronic lock.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

Figure 1:
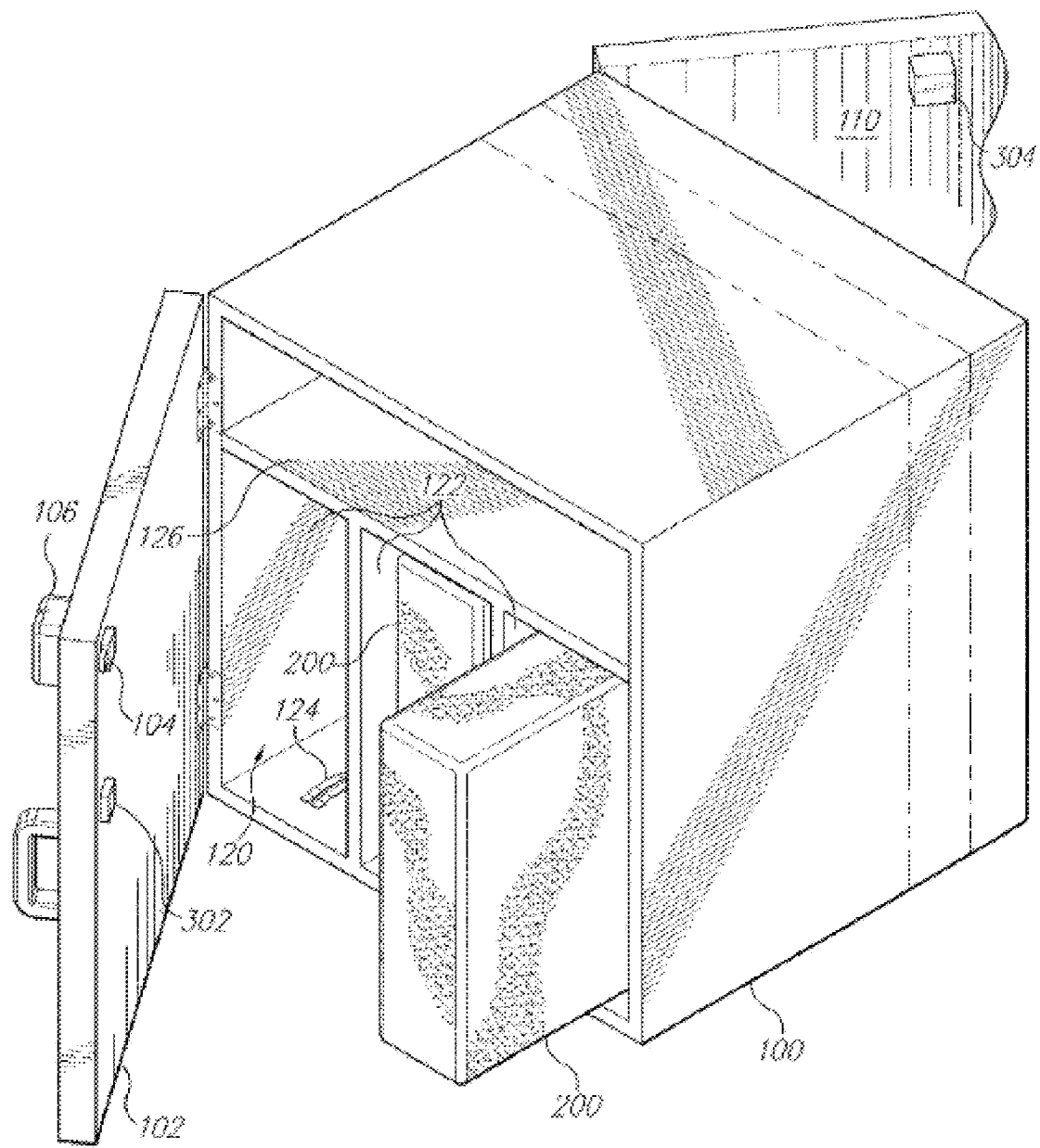
FIG. 1 representatively illustrates a delivery box in accordance with an exemplary embodiment of the present technology.

The present technology may be described in terms of functional block components and various processing steps. Such functional blocks may be realized by any number of components configured to perform the specified functions and achieve the various results. For example, the present technology may employ various types of computing systems, networks, software, shipment containers and techniques, and the like which may carry out a variety of functions. In addition, the present technology may be practiced in conjunction with any shipment and/or delivery system and the system described is merely one exemplary application for the technology. Further, the present technology may employ any number of conventional techniques for loading, storing, and transferring information between electronic devices over a network, operating (i.e., locking and unlocking) an electronic lock, verifying shipping information, and/or reading specific shipping information.

Methods and apparatus for a secure delivery system according to various aspects of the present technology may operate in conjunction with any suitable computer system, network, autonomous delivery system, and/or shipping container. Various representative implementations of the present technology may be applied to any system configured to facilitate the shipment and/or transportation of goods from one location to another.

Referring to FIGS. 1-5, in one embodiment, a secure delivery system may comprise a delivery box 100 having a main door 102 providing access to a first receiving section 120. The main door 102 may be securable by a first electronic lock 104. The first electronic lock 104 may be configured to grant access to the first receiving section 120 positioned within an interior space of the delivery box 100 in response to an appropriate signal.

In one embodiment, the electronic lock 104 may comprise any suitable system or method configured to control access to the first receiving section 120. The electronic lock 104 may comprise any suitable system configured to operatively lock and/or unlock the main door 102. For example, the electronic lock 104 may comprise a dead bolt system, a tumbler system, or the like. The electronic lock 104 may be further configured to operate in conjunction with any suitable type of input device such as a touchscreen, a keypad, a number pad, an alpha-numeric keypad, a biometric scanner, a RFID reader, and/or the like to grant access to the first receiving section 120. The electronic lock 104 may also be responsive to a wireless signal received over a communication network such as Bluetooth®, wireless Ethernet (802.11b), near field communication (NFC), a mobile communication network, or a similar technology.

For example, in one embodiment, the electronic lock 104 may be configured to operate in conjunction with a keycard reader 106. The keycard reader 106 may be configured to read, scan, and/or otherwise retrieve information stored on a keycard 105 to gain entry to the first receiving section 120 via the electronic lock 104. For example, the keycard reader 106 may be configured with a slot configured to receive at least a portion of the keycard 105. After the keycard 105 in positioned in, or swiped through the slot, the delivery system may be configured to perform an authentication process to ensure that the person and/or keycard 105 attempting to gain access to the first receiving section 120 is authorized to do so. For example, the authentication process may check whether the keycard 105 is still active, whether a correct PIN or passcode was entered corresponding to the card, and the like.

In an alternative embodiment, the electronic lock 104 may comprise a smart lock that is responsive to wireless signals. For example, the electronic lock 104 may be configured to recognize a user's computing device using a Bluetooth® signal. Once the electronic lock 104 recognizes the user's device, the electronic lock 104 may unlock the main door 102 and allow access to the first receiving section 120. Similarly, the electronic lock 104 may be responsive to the presence of the portable transport box 200 and be configured to initiate a communication sequence between the portable transport box 200 and the electronic lock 104 to confirm a one-time unlock code that can unlock the main door 102.

In one embodiment, the first receiving section 120 of the delivery box 100 may comprise a single compartment or multiple compartments. For example, as shown in FIG. 1, the first receiving section 120 may be configured with multiple transport box receptacles 122. Each of the transport box receptacles 122 may be configured to receive a portable transport box 200. An additional space 126 may be provided for receiving goods not packaged in a portable transport box 200. The various compartments of the first receiving section 120 may be configured with a delivery box electrical contact 124. The delivery box electrical contacts 124 disposed within the first receiving section 120 of the delivery box 100 may be configured to come into contact with the transport box electrical contacts 208 disposed upon the portable transport box 200. The delivery box electrical contacts 124 may be configured to provide electrical power to the portable transport box 200. For example, the delivery box electrical contacts 124 may be configured to provide electrical power to portable transport box 200 to operate an environmental control module configured to monitor and adjust an interior temperature of the portable transport box 200 by cooling and/or heating an interior space of the portable transport box 200. Once coupled together, the delivery box electrical contacts 124 and the transport box electrical contacts 208 may also be configured to exchange information between the portable transport box 200 and the various other components of the variable destination delivery, such as the transport box controller 250, the delivery box controller 150, and/or a communication network such as the Internet 20.

In one embodiment, the delivery box 100 may be configured to operate in a stand-alone configuration or in a wall-mounted pass-through configuration as shown in FIGS. 3, 11, and 13-16. In the stand-alone configuration, the delivery box 100 may be configured to grant and/or otherwise allow access to the first receiving section 120 only through the main door 102. In the wall-mounted pass-through configuration, the delivery box 100 may be configured to grant and/or otherwise allow access to the first receiving section 120 through the main door 102 and a second door 110.

The second door 110 may be configured to grant access to the first receiving section 120 and a second receiving space 1300. For example, in one embodiment, the second door 110 may be configured to operate in conjunction with a second electronic lock 304. The second electronic lock 304 may be the same type, and operate in the same manner as the first electronic lock 104. Alternatively, or in addition to, the second door 110 may be configured with a touch screen interface configured to operate the second electronic lock 304. The touch screen interface may be configured to receive inputs from a person, and operate various components of the secure delivery system based on the received inputs. For example, the touch screen interface may be configured to receive a passcode via an alphanumeric keypad to gain access to the delivery box first and second receiving sections 120, 1300. The touchscreen interface may also be configured to receive biometric inputs as passcodes such as fingerprints, facial recognition, retina scans, voice recognition, and the like. The touchscreen interface may be further configured to receive and/or otherwise retrieve information from an RFID tag, an electronic device, a keycard, and or a wireless signal.

The delivery box 100 may further comprise any system or device configured to provide power to the delivery box 100, the portable transport box 200, and/or any other component of the secure delivery system. For example, solar panels may be disposed on the exterior surface of the delivery box 100. The solar panels may be configured to provide electrical power to any of the various components of the secure delivery system. For example, the solar panels may be configured to power any desired system such as the electronic locks 104, 304, the keycard reader 105, an environmental control unit, and the like.

In one embodiment, the delivery box 100 may be configured to be mounted on a vehicle such as a RV or semi-truck. The delivery box 100 may be configured such that the main door 102 is utilized by a delivery person on the outside of the vehicle and the second door 110 may be utilized by a person on the inside of the vehicle. The delivery box 100 may be configured with any suitable system or method to be mounted on the vehicle. The delivery box 100 may be further configured with any suitable system or method to connect to the power supply of the vehicle. For example, the delivery box 100 may be configured with attachment sleeves that may be configured to connect a power source of the delivery box to the power source of the vehicle (for example, the vehicle battery). Once coupled together, the delivery box 100 may be configured to receive its power from the vehicle to power various components such as the heating device 258, the cooling device 256, the electronic locks 104, 304, a communication system, and/or any other electrically powered component of the secure delivery system.

The main door 102 and/or the second door 110 may be configured to with any suitable system or method to display information. For example, an advertisement space may be designated on the exterior of the main door 102 of the delivery box 100. The advertisements may be in hard-copy form or in an electronic format. For example, an electronic display screen may be disposed on the exterior of the main door 102. The electronic display screen may be configured to display advertisement information and/or configured to display and/or convey any other type of media content.

Figure 4:
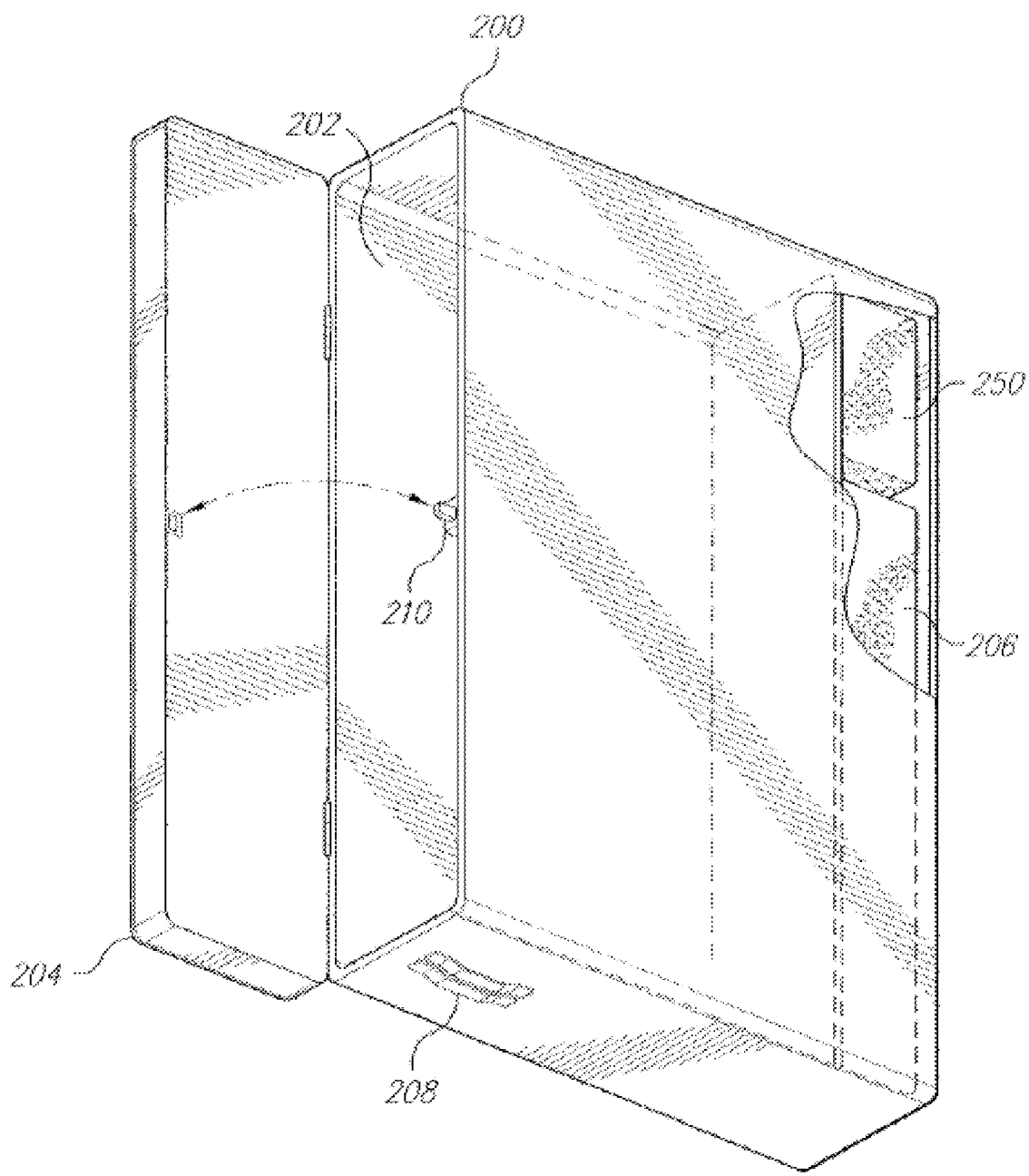
FIG. 4 representatively illustrates a transport box in accordance with an exemplary embodiment of the present technology.

Now referring to FIG. 4, the portable transport box 200 may comprise any suitable system configured to receive goods for transport and/or shipment. For example, the portable transport box 200 may comprise a container having storage space 202 for receiving and storing goods for transport and/or shipment. The portable transport box 200 may be configured with a hinged and/or removable cover 204 which may be configured to allow access to the storage space 202.

The transport box 200 may further comprise an environmental control module 206 configured to control the environment within the storage space 202. The environmental control module 206 may comprise any suitable system to monitor, adjust, and/or report the conditions of the storage space 202. For example, the environmental control module may be configured to operate a heating and/or cooling device to maintain and control the internal temperature of the transport box according to a set of delivery instructions. In one embodiment, a transport box controller 250 may be configured to operate with the environment control module 206 to operate the environment control module 206 to maintain a predetermined environment within the storage space 202. Transport box electrical contacts 208 may be configured to be disposed on the outside of the transport box 200, and may be configured to operate in conjunction with the electrical contacts 124 of the transport box receptacle 122 within the delivery box 100. The environmental control module 206 may be configured to retrieve instructions from the transport box controller 250. For example, it may be the case that a delivery process requires the item to be maintained at or below a certain temperature threshold, and this information may be downloaded to the transport box controller 250 via the Internet 20 as at least a part of a set of delivery instructions defining the delivery process. The transport box controller 250 may then utilize these instructions to control a heating device 258 and/or a cooling device 256 disposed on and/or within the portable transport box 200 to maintain the item at or below the threshold temperature during the delivery process.

In one embodiment, the transport box controller 250 may be configured to monitor internal environment conditions of the portable transport box 200 such as temperature, and/or humidity. If the transport box controller 250 determines that one of the parameters (e.g., temperature) has deviated beyond a desired target, the transport box controller 250 may be configured to activate the cooling device 256 and/or the heating device 258 to bring the parameter back within its intended range or generate a signal bring the deviation to the attention of a delivery person or any other suitable person or system that may be able to take appropriate action to prevent the item being transferred from spoiling or going bad.

The heating device 258 may comprise any suitable system or method configured to increase the ambient temperature of the storage space 202. The heating device 258 may be disposed internally within the storage space 202, externally on the body of the portable transport box 200 itself, and/or a combination of the two. The heating device 258 may be communicatively linked to the transport box controller 250 such that information may be transmitted and received to and from the portable transport box 200 to the transport box controller 250 and/or various other components of the secure delivery system. The transport box controller 250 may be further configured to send instructions to the heating device 258. These instructions may comprise instructions to begin heating, stop heating, and/or the like. The heating device 258 may comprise a passive heating element such as a heat pad or an active heating element such as an electrically powered or chemically activated heater.

The cooling device 256 may comprise any suitable system or method configured to decrease the ambient temperature of the storage space 202. The cooling device 256 may be disposed internally within the storage space 202, externally on the body of the portable transport box 200 itself, and/or a combination of the two. The cooling device 256 may be configured to comprise both the cooling device as well as the heating device 258. For example, the combined heating/cooling device may be configured to either lower the ambient temperature and/or increase the ambient temperature based on the current ambient temperature. The cooling device 256 may be communicatively linked to the transport box controller 250 such that information may be transmitted and received to and from the portable transport box 200 to the transport box controller 250 and/or various other components of the secure delivery system. The transport box controller 250 may be further configured to send instructions to the cooling device 256. These instructions may comprise instructions to begin cooling, stop cooling, and/or the like. The cooling device 256 may comprise a passive cooling element such as an ice pack or an active cooling element such as an electrically powered or chemically activated a cooler.

In one embodiment, an electronic locking mechanism 210 may be configured to operate in conjunction with the transport box controller 250. For example, the transport box 200 may be configured to be locked until unlocked by the transport box controller 250, such as when the transport box controller 250 recognizes that the portable transport box 200 has been placed within a transport box receptacle 122 within the delivery box 100.

The delivery box 100 may comprise a delivery box controller 150. The delivery box controller 150 may be configured to operate the electronic lock 104 of the main door 102 and/or the second electronic lock 304 of the second door 110. The delivery box controller 150 may also be configured to manage access and/or security codes and access to the first and second receiving sections 120, 1300 of the delivery box 100. For example, the delivery box controller 150 may be configured to exchange an authorized code needed to operate the electronic locks 104, 304 over the Internet 20. If the electronic locks 104, 304 are communicatively coupled to the keycard reader 106, then the delivery box controller 150 may be configured to perform authentication processes by verifying whether the keycard 105 read contains the proper authorizations. In another example, if the electronic locks 104, 304 are communicatively coupled to a biometric scanner, the delivery box controller 150 may be configured to retrieve biometric information to verify whether the access attempt is authorized.

In one embodiment, the delivery box electrical contacts 124 and the transport box electrical contacts 208 may be configured to come into contact with each other to establish a communication channel between the delivery box 100 and the portable transport box 200 such that information may be communicated back and forth via the communication interface 158. The communication interface 158 may also comprise a wireless communication interface 158 such that information may be communicated between the portable transport box 200, the delivery box 100, and various other components wirelessly. In another embodiment, a wireless method of communication may be utilized for communication between the delivery box controller 150 of the delivery box 100 and the transport box controller 250 contained in the portable transport box 200.

Figure 5:
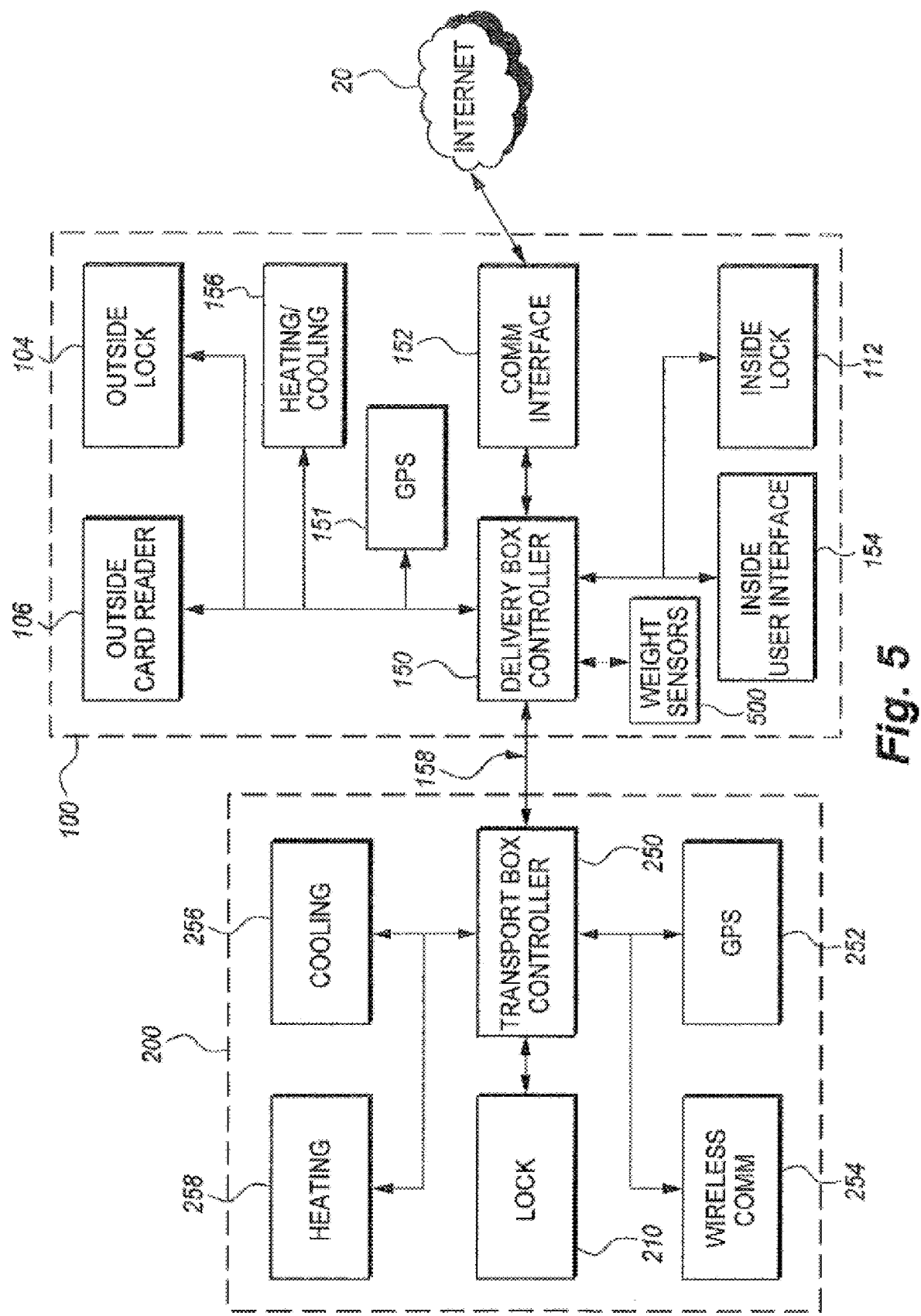
FIG. 5 representatively illustrates a block diagram of various components of the delivery box and the transport box in accordance with an exemplary embodiment of the present technology.

Now referring to FIG. 5, in one embodiment, the communication interface 158 may be configured to facilitate communication and/or the transfer of information between the portable transport box 200 and the delivery box 100. For example, the transport box controller 150 and the delivery box controller 250 may be configured to communicate, via the communication interface 158, information such as a GPS location of the portable transport box 200, the interior environment of the storage space of the transport portable box 200, the electronic lock 104 of the delivery box, and/or various other components of the portable transport box 200 and/or the delivery box 100.

In one embodiment, the delivery box controller 150 may be configured to communicate with the Internet 20. The communication interface 152 may be configured to utilize a wireless technology for remote communication. The delivery box controller 150 may be further configured to be in communication with the card reader 106 and the electronic locks 104, 304. The delivery box controller 150 may be configured to read and/or otherwise retrieve a security code from an electronic keycard 105 swiped through, or inserted into, the card reader 106. The delivery box controller 150 may be configured to operate the electronic locks 104, 304 according the information read from the electronic keycard 105. The delivery box controller 150 may be configured to be in communication with lock 112, and/or a user interface 154 such as a keypad, an electronic key reader, and/or the like configured to control or record user access to the delivery box. For example, the delivery box controller 150 may be configured to keep a log of all attempts to access the delivery box electronic lock 104. The delivery box controller 150 may be further configured to record the information used in the attempt to access the delivery box 100, such as the information relating to the date/time the access attempt was made, the GPS location of the access attempt, the keycard 105 used, the information entered into the user interface 154, and the like. The information recorded may be stored and/or transmitted to the customer, the merchant, and/or the shipping company.

In another exemplary embodiment, the delivery box controller 150 may be configured to generate a delivery signal with the portable transport box 200 is within a predetermined distance from the delivery box 100. The delivery signal may cause the electronic lock 104 to unlock thereby providing access to the first receiving section automatically when the portable transport box 200 is actively being delivered to the delivery box 100.

Figure 8:
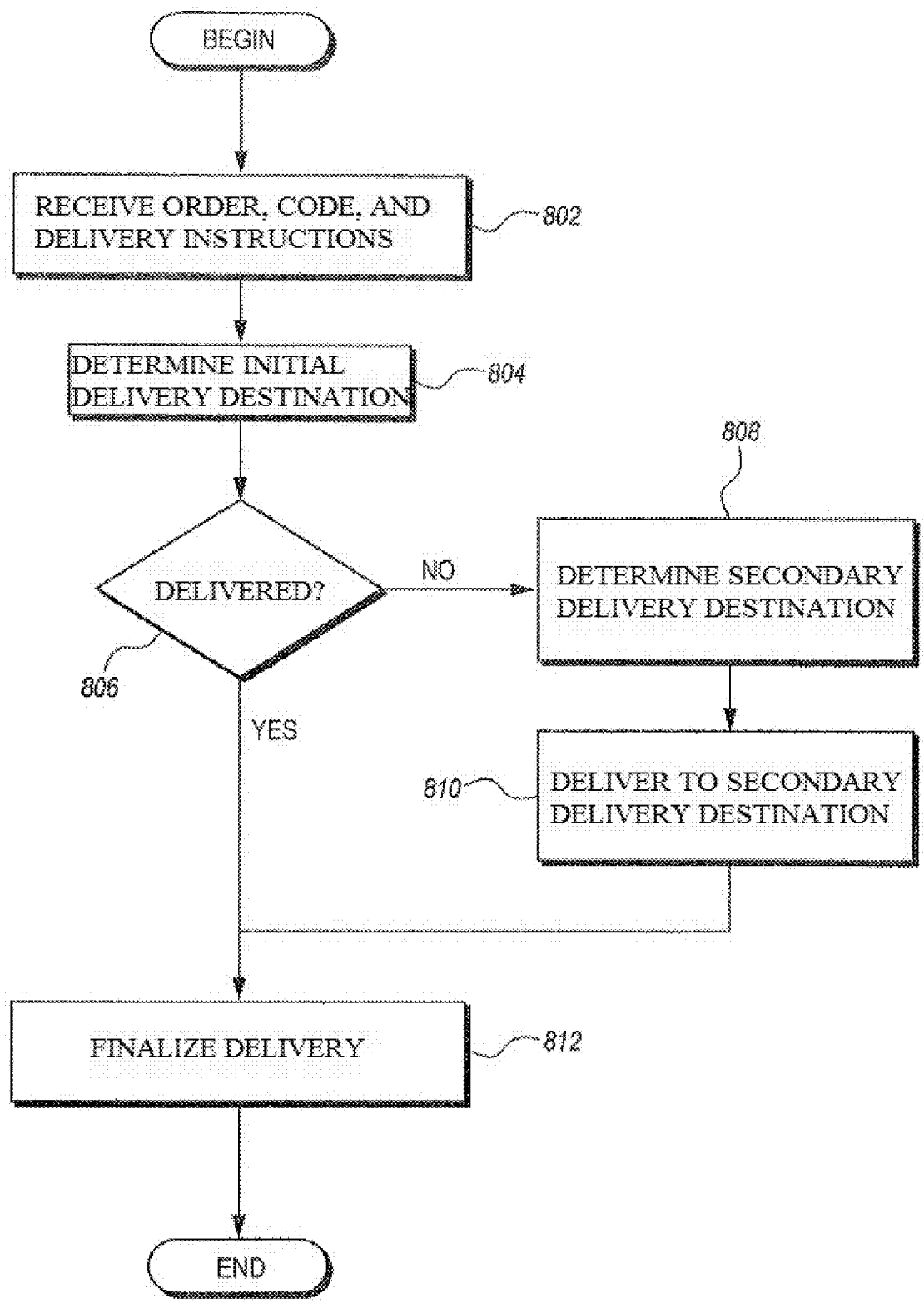
FIG. 8 representatively illustrates an exemplary method of delivering an order in accordance with an exemplary embodiment of the present technology.

Referring now to FIGS. 5 and 8, in one embodiment, the delivery box controller 150 may be communicatively linked to a delivery box Global Positioning System (GPS) receiver 151. The delivery box GPS receiver 151 may be configured to determine and/or provide the geographical location of the delivery box 100 for delivery purpose (e.g., tracking). The delivery box controller 150 may be configured to receive information related to an order (802) such as the items to be shipped and/or transported, information required to access the electronic locks 104, 304, and/or a set of delivery instructions. The secure delivery system may be configured to determine an initial delivery destination (e.g., a street address or a specific location) (804). The initial delivery destination may be inputted, downloaded, uploaded, transferred, and/or otherwise be linked to the delivery box controller 150. For example, when the customer first places an order for items to be shipped and/or transported, the customer may provide the shipping company with a specific address to deliver the shipment to as the initial delivery destination. The initial delivery destination may then be downloaded onto the delivery box controller 150, which is configured to retrieve the initial delivery destination.

In one embodiment, the initial delivery destination may comprise the location of the GPS-enabled electronic device from which the customer used to place an order. For example, a customer may order a pizza using their smart phone or tablet, and the secure delivery system may be configured to retrieve the current GPS location of the GPS-enabled electronic device used to place the order and use that as the initial delivery destination.

In one embodiment, if the secure delivery system may be configured to determine a secondary delivery destination (808) if it is determined that the initial delivery destination is no longer appropriate and/or the shipment could not be delivered to the initial delivery destination (806). The secondary delivery destination may be configured to be the destination to which the shipment should be delivered (810) in the chance that the initial delivery destination is no longer appropriate. Once the delivery has been completed (to either the initial delivery destination or the secondary delivery destination), the delivery may be finalized (812). Finalizing the delivery may comprise updating the secure delivery system to indicate that the shipment has been delivered.

In one embodiment, the delivery box control 150 may be configured to receive information relating to the secondary delivery destination. The secondary delivery destination may be dynamic or static. For example, the secondary delivery destination may be dynamic based on the location of a GPS-enabled electronic device or the secondary delivery destination may be static based on the location of a specific address and/or location. The secondary delivery destination may be a default delivery destination determined by the customer when they place their order.

In one embodiment, the delivery box control 150 may be configured to receive specific shipping instructions, including time constraints, temperature constraints, and the like. For example, if the shipment requires a certain temperature threshold not be passed, the delivery box controller 150 may be configured to communicate with the transport box controller 250 to ensure that the temperature threshold is maintained by operating either the heating device 258 and/or the cooling device 256. In one embodiment, the delivery box controller 150 may comprise a microcomputer or microcontroller, and/or any other type of programmable logic device, and/or a memory for storing programming instructions and the like.

In one embodiment, the transport box controller 250 may comprise a transport box Global Positioning System (GPS) receiver 252. The portable transport box 200 may further comprise a wireless communications interface 254 such as Bluetooth®, wireless Ethernet (802.11b), NFC, or a similar technology. The transport box controller 250 may be configured to be communicatively linked with the various components of the portable transport box 200, such as a mobile application software and the transport box GPS receiver 252, the wireless communication interface 254, the electronic locking mechanism 210, the transport box heating module 258, and/or the transport box cooling module 256. The transport box controller 250 may comprise a microcomputer or microcontroller, and/or other type of programmable logic device, and/or a memory for storing programming instructions.

Figure 12A:
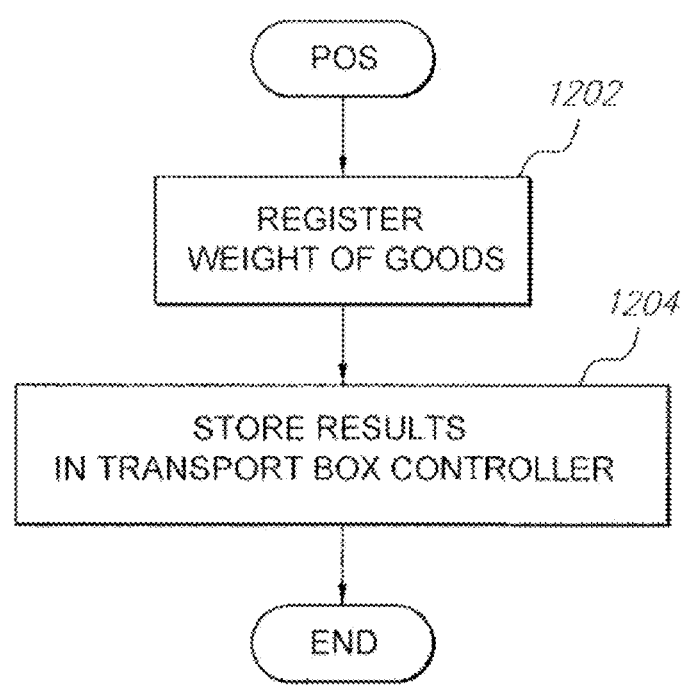
FIGS. 12A and 12B representatively illustrate a method of incorporating a weight of the goods in accordance with an exemplary embodiment of the present technology.
Figure 12B:
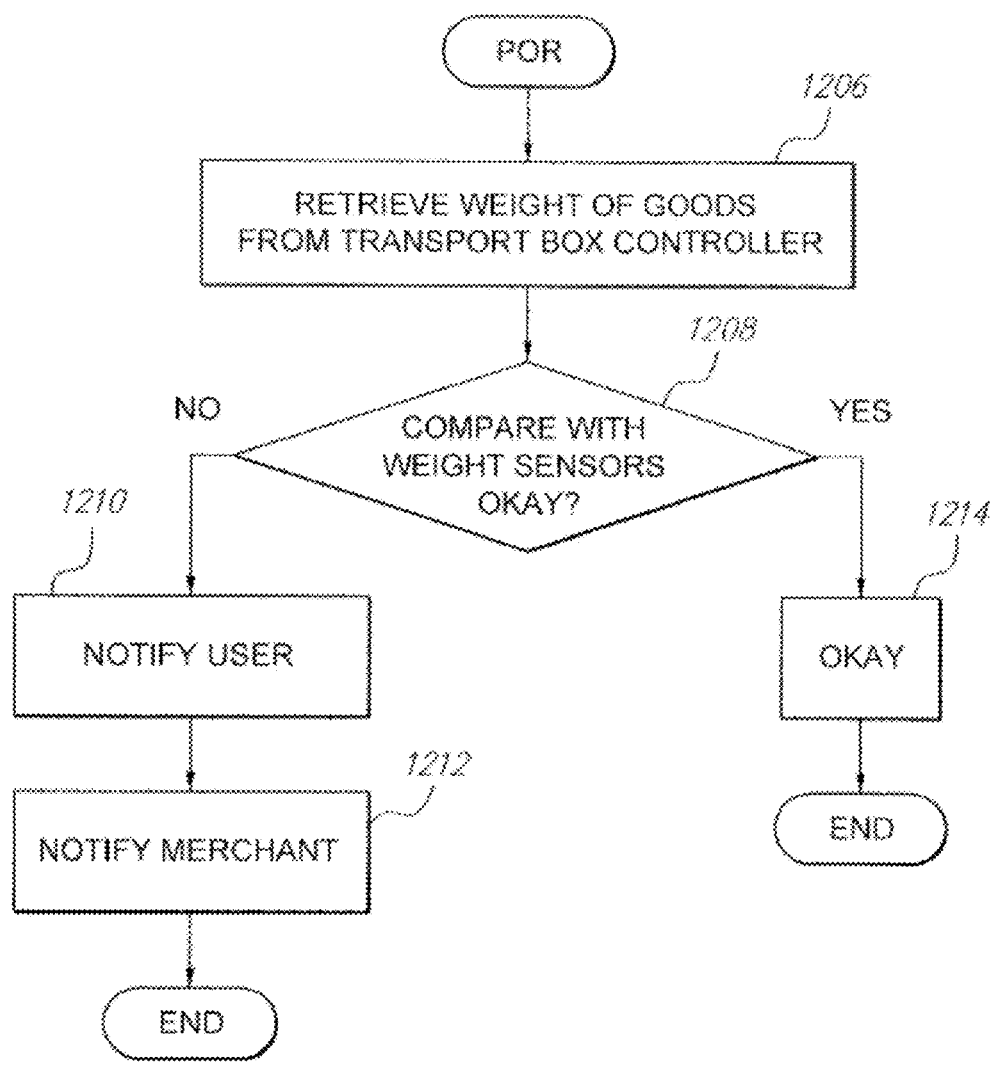
Figure 13:
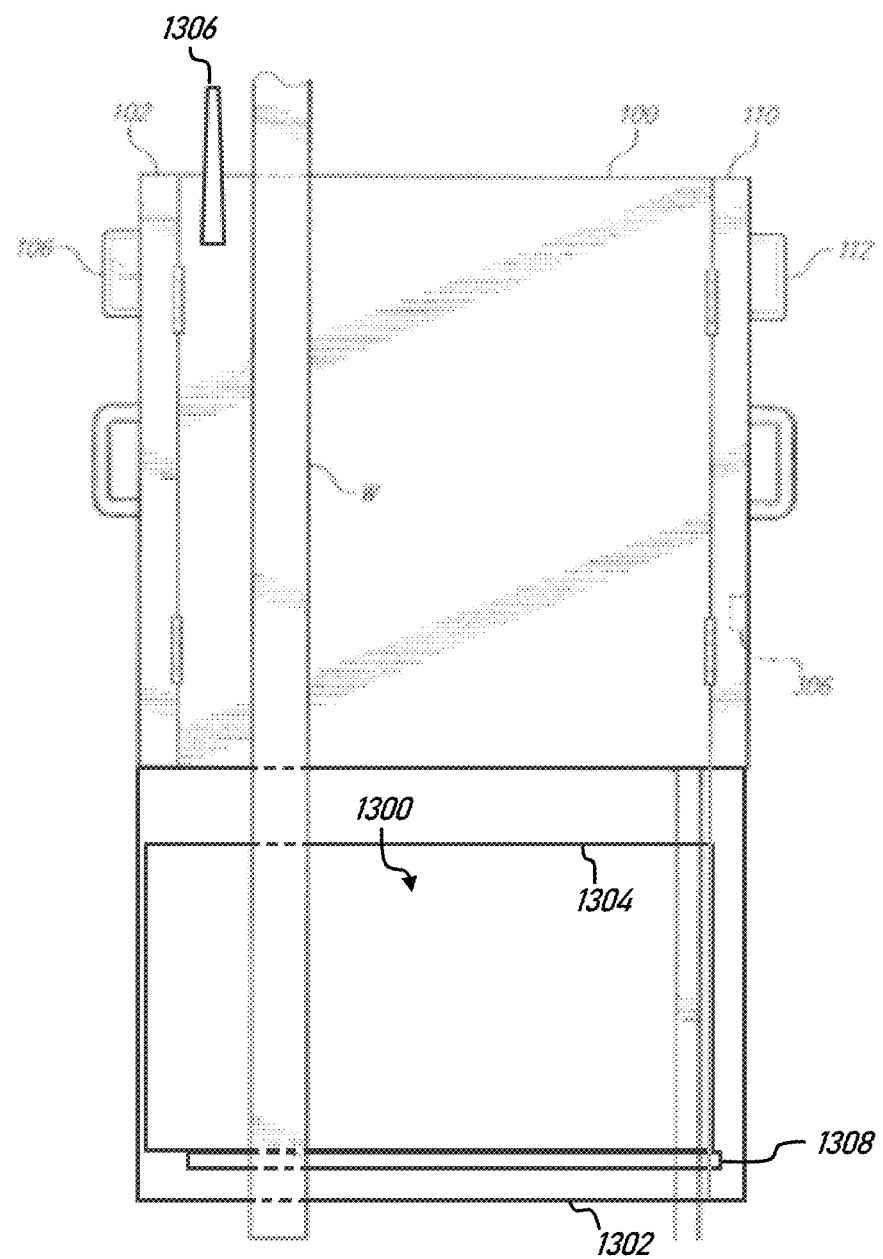
FIG. 13 representatively illustrates a side view of the delivery box with an extendible tray in a retracted position in accordance with an exemplary embodiment of the present technology.

Referring now to FIGS. 12A and 12B, in one embodiment, weight sensors 500 may be disposed within the delivery box 100. The weight sensors may be configured to communicate with the delivery box controller 150. The weight sensors may be further configured to weigh the weight of the goods to be delivered and/or transported and may then registered the information (1202) at the point of sale (POS) and transmit the information to the transport box controller 250 (1204). The delivery box controller 150 may be configured to compare the weight of the delivered goods at the point of reception (POR), i.e., at the delivery box 100, with the weight of the delivery goods recorded at the point of sale.

The POR processing entails the POS weight of goods being retrieved from the transport box controller 250 (1206) and compared with the information received from the weight sensors 500 (1208). Any weight discrepancy may result in a notification being generated to notify the customer (1210) and/or the merchant (1212). If the weight is included in the shipping instructions, the goods delivery may be rejected based on non-compliance with the shipping instructions due to weight discrepancy. Otherwise, an all-clear (e.g., status is okay) notification may be generated (1214).

In one embodiment, the delivery box 100 and/or the portable transport box 200 may be configured with any suitable system for tracking, logging, and/or managing the inventory of delivery boxes 100 and/or portable transport boxes 200. For example, each of the delivery boxes 100 and portable transport boxes 200 may be configured with a unique serial number. The secure delivery system may be configured to keep a log of all the delivery boxes 100 and/or portable transport boxes 200 currently assigned to an entity. The serial numbers may be referenced by the secure delivery system to determine the geographical location of the delivery box 100 and/or portable transport box 200.

Figure 6:
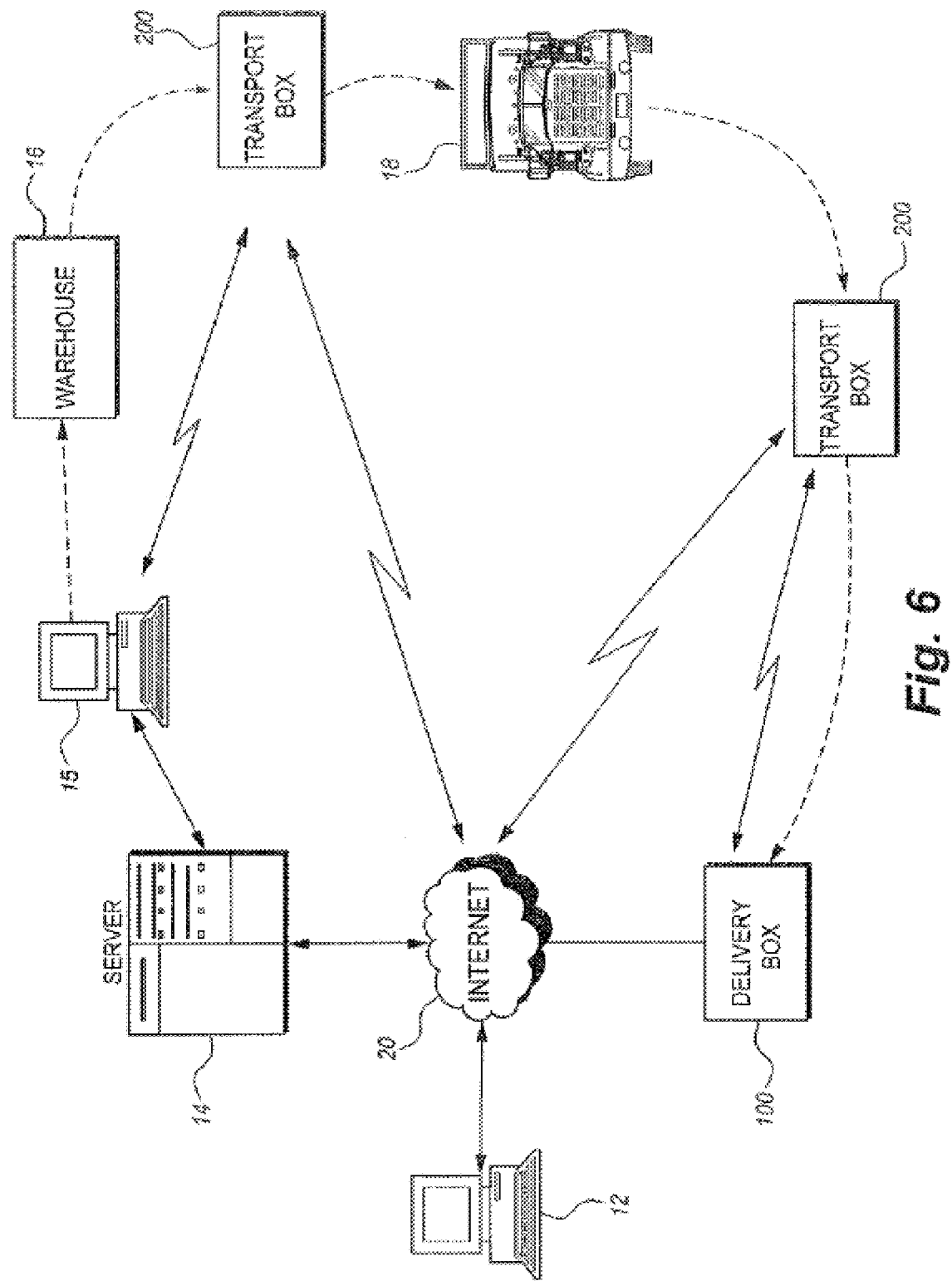
FIG. 6 representatively illustrates a delivery system in accordance with an exemplary embodiment of the present technology.

Now referring to FIG. 6, the secure delivery system may be configured to utilize a delivery box 100, wherein the delivery box 100 may be configured to be in communication with the Internet 20. A customer using an electronic device 12 to access the Internet 20 may browse the World Wide Web seeking an Internet merchant of desired goods. Once the desired goods have been located, the user may place an order for delivery of those goods to the customer's delivery box 100.

An application server 14 comprising a central processing system may be configured to communication over a communication network such as the Internet 20 and receive order data for goods. The order data may comprise user information such as name, address, and payment information. The address may be entered by the user or the address may be determined according to the geographic location of a delivery box 100 associated with the user. For example, the user information may comprise data relating to a specific delivery box 100 that is associated with the user. In response to receiving a new order from the user, the central processing system may send a signal to the user's delivery box 100 requesting a current geographic location of the delivery box 100. The delivery box 100 may send back the requested geographic location which is then used by the central processing system to generate the address for delivery of the ordered goods. In the event that the delivery box 100 is moved between the time the order is placed and delivered, the delivery box GPS receiver 151 of the delivery box 100 may generate a new geographic location and the transport box controller circuit may communicate the new location to the central processing system so that the set of delivery instructions may be updated to reflect a new delivery location.

The central processing system may use the order data in conjunction with a set of delivery data for the ordered goods to generate a set of delivery instructions. A delivery processing system may then communicate the generated delivery instructions to one or more recipients such as the user's delivery box 100 and/or an order fulfillment center 16 such as a warehouse, restaurant, grocery store, or the like by way of vendor or warehouse computer 15 in communication with the application server 14.

An unlock or security code may be generated by the delivery processing system as part of the delivery instructions for the order. The unlock code may be generated in any suitable format to allow a delivery driver to access the user's delivery box 100. The unlock code may comprise a unique randomly generated one-time code that corresponds to a particular order. For example, in one embodiment, a keycard 105 may be created bearing the unlock code in an electronically readable format. Alternatively, the unlock code may be stored on the transport box controller 250 of the portable transport box 200 as part of the set of delivery instructions.

The goods may be packaged into a portable transport box 200, and the set of electronic delivery instructions may be downloaded into the transport box controller 250. A shipping or delivery service 18 delivers the portable transport box 200 to the user's delivery box 100, using any of the methods describes above to open the delivery box 100, whereupon the portable transport box 200 is placed into a transport box receptacle 122 within the delivery box 100. Alternatively, the portable transport box 200 may communicate a signal containing the unlock code that can be received by the delivery box. Upon receipt of the signal, the delivery box 100 may activate the electronic lock 104 and allow access to the first receiving section 120 of the delivery box 100.

Figure 7:
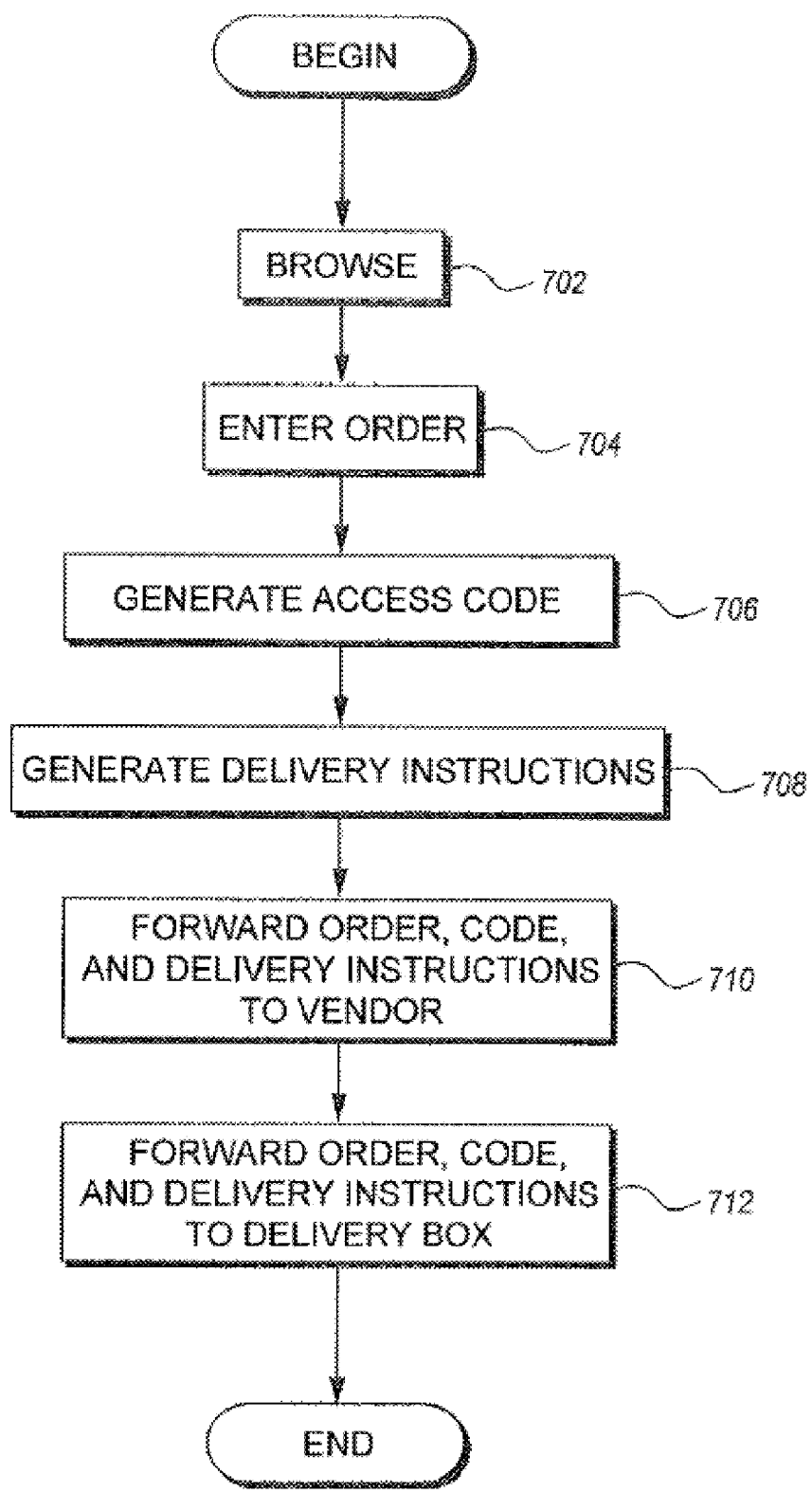
FIG. 7 representatively illustrates an exemplary method of placing an order with the delivery system in accordance with an exemplary embodiment of the present technology.

Now referring to FIG. 7, a method for entering an order by a customer may comprise browsing the Internet 20, and particularly a merchant web site, to locate goods for purchase (702). With goods selected, an order may be entered (704). The order entry may comprise completion of a payment transaction, wherein the customer enters payment information such as a credit card number or appropriate identification for another online payment service or software application.

Once the order is entered, and payment confirmed, the secure delivery system may be configured to generate the order data and/or the set of delivery instructions containing the unlock (access) code (706). The set of delivery instructions may be downloaded and/or otherwise transferred to the delivery box controller 150. The keycard 105 may also be generated and/or imprinted with information containing the set of delivery instructions or unlock code. The unlock code may be configured to function as a security code for access to the delivery box 100, and also may be configured to track and/or modify the order. For example, if the customer placed an order for pizza using a mobile computing device, the initial delivery destination may comprise the location of the customer's delivery box 100. If the customer wishes to change the delivery to a secondary delivery destination, the central processing system may be configured to allow the user to change the delivery destination by providing the unlock code and an address where the delivery box 100 will be located at the expected delivery time.

In one embodiment, separate (i.e., different) security and tracking codes may be used. Codes may be encrypted for distribution, over the Internet, to the merchant and the delivery box 100. The set of delivery instructions may be generated and downloadable to the transport box 200 and/or the delivery box controller 150 (708). The set of delivery instructions may be configured to comprise information identifying special handling for the goods that will be shipped and/or transported by the delivery box 100 and/or portable transport box 200. For example, the set of delivery instructions may include instructions that can be used by the transport box controller 250 to control an environmental control unit disposed within the portable transport box 200. In one embodiment, the set of delivery instructions may comprise temperature or environmental parameters to be maintained by the delivery box 100 and/or portable transport box 200. The delivery instructions may also comprise security instructions such as a geographic area or GPS location where delivery is to occur. The delivery instructions may also comprise a due date, time deadline, and/or an expiration time for the order.

Figure 2:
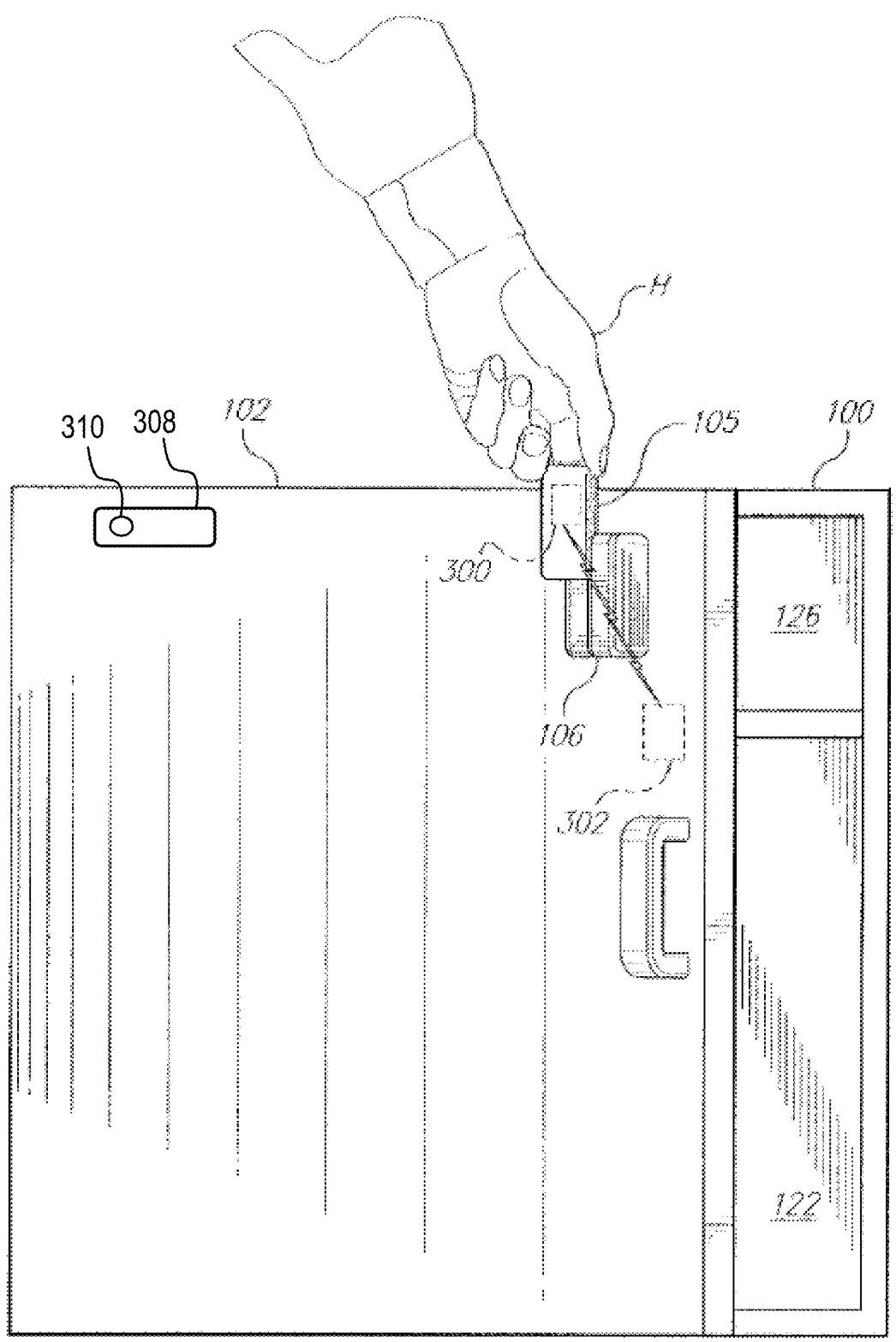
FIG. 2 representatively illustrates a side view of the delivery box in accordance with an exemplary embodiment of the present technology.

In the above, additional security may be provided by the usage of additional wireless or hardwired sensors. As shown in FIG. 1 and FIG. 2, a wireless tag, such as a radio frequency ID (RFID) chip 300 may be embedded within keycard 105. Alternatively, such a wireless tag may be carried by the delivery person. RFID chip 300 (or any other wireless transmitter) includes either the same access code or a secondary access code, which is transmitted and received by a wireless sensor 302, mounted on the interior of the main door 102, or mounted in any other suitable location within the system. In order to access the interior, the delivery person needs to swipe the keycard 105, which has the proper access code encoded thereon, and also have the wireless tag 300. Alternatively, a wired system may be utilized. Sensor 302 is in communication with controller 250.

Figure 3:
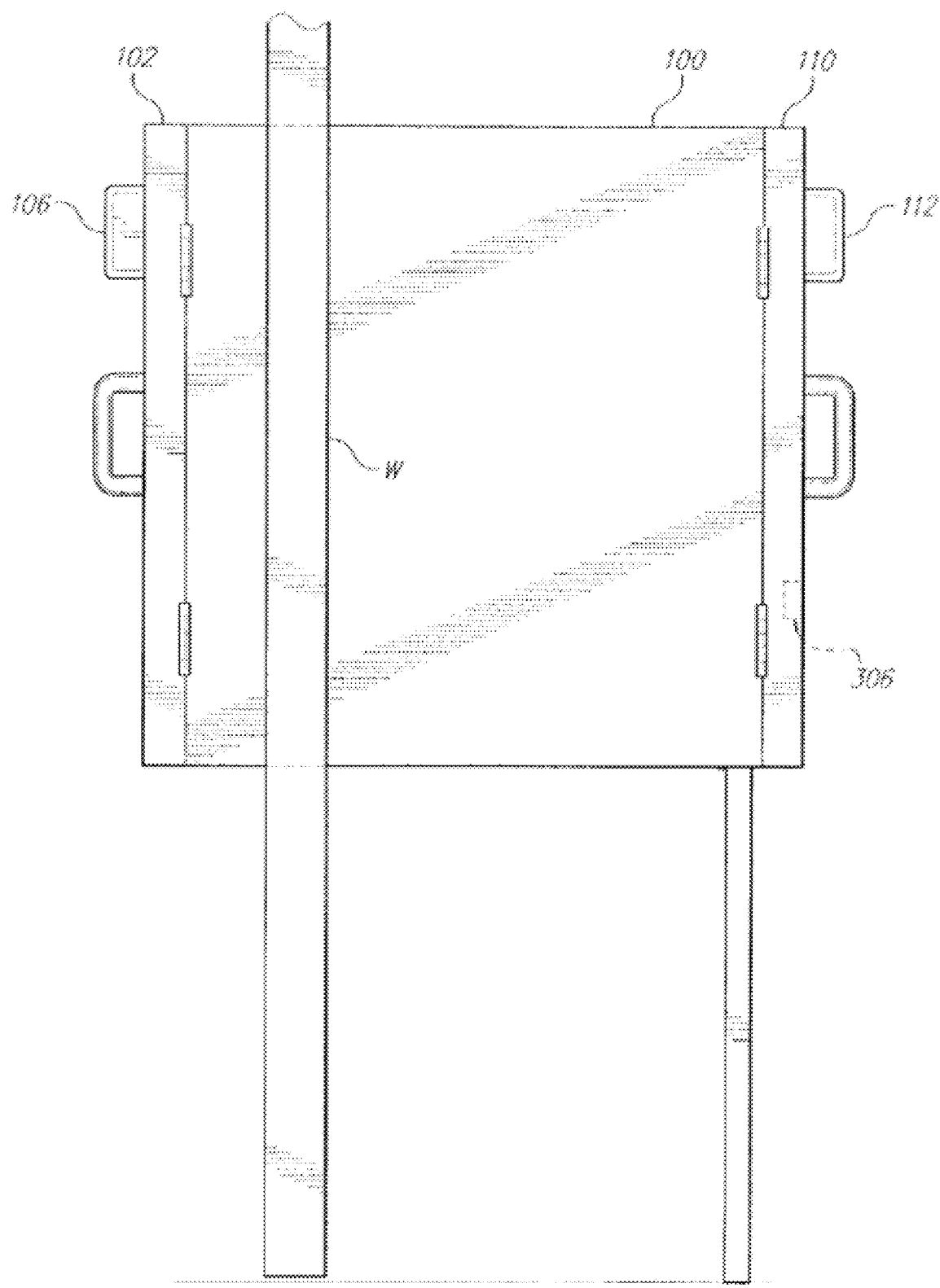
FIG. 3 representatively illustrates an embodiment of the delivery box affixed to a structure in accordance with an exemplary embodiment of the present technology.

Additionally, a similar sensor 304 (as shown in FIG. 1) may be mounted on the interior side of the system, requiring the interior, household user to also have an encoded wireless tag. Further, as shown in FIG. 3, a computer port 306, such as a USB port or the like, may be incorporated in the second door 110, with sensor 304 and USB port 306 also being in communication with the transport box controller 250. In order to access the interior, the user needs to have the properly encoded wireless tag, along with a portable device or computer, also having an encrypted code stored thereon, which is transmitted to the transport box controller 250 via port 306. It should be understood that any suitable type of sensor may be utilized, and any suitable type of computer interface may also be utilized. The wireless sensors and USB port shown in the Figures are shown for exemplary purposes only.

The main door 102 may also comprise additional sensors disposed on an exterior facing surface such as a motion sensor 308 and a camera 310. For example, the motion sensor 308 may be responsive to movement and trigger to activation of the camera 310 to provide a digital recording or live stream of the delivery person as they complete the delivery. Similarly, the motion sensor 308 and camera 310 may be used to provide an additional layer of security against attempted theft of the contents contained within the delivery box 100.

Figure 9:
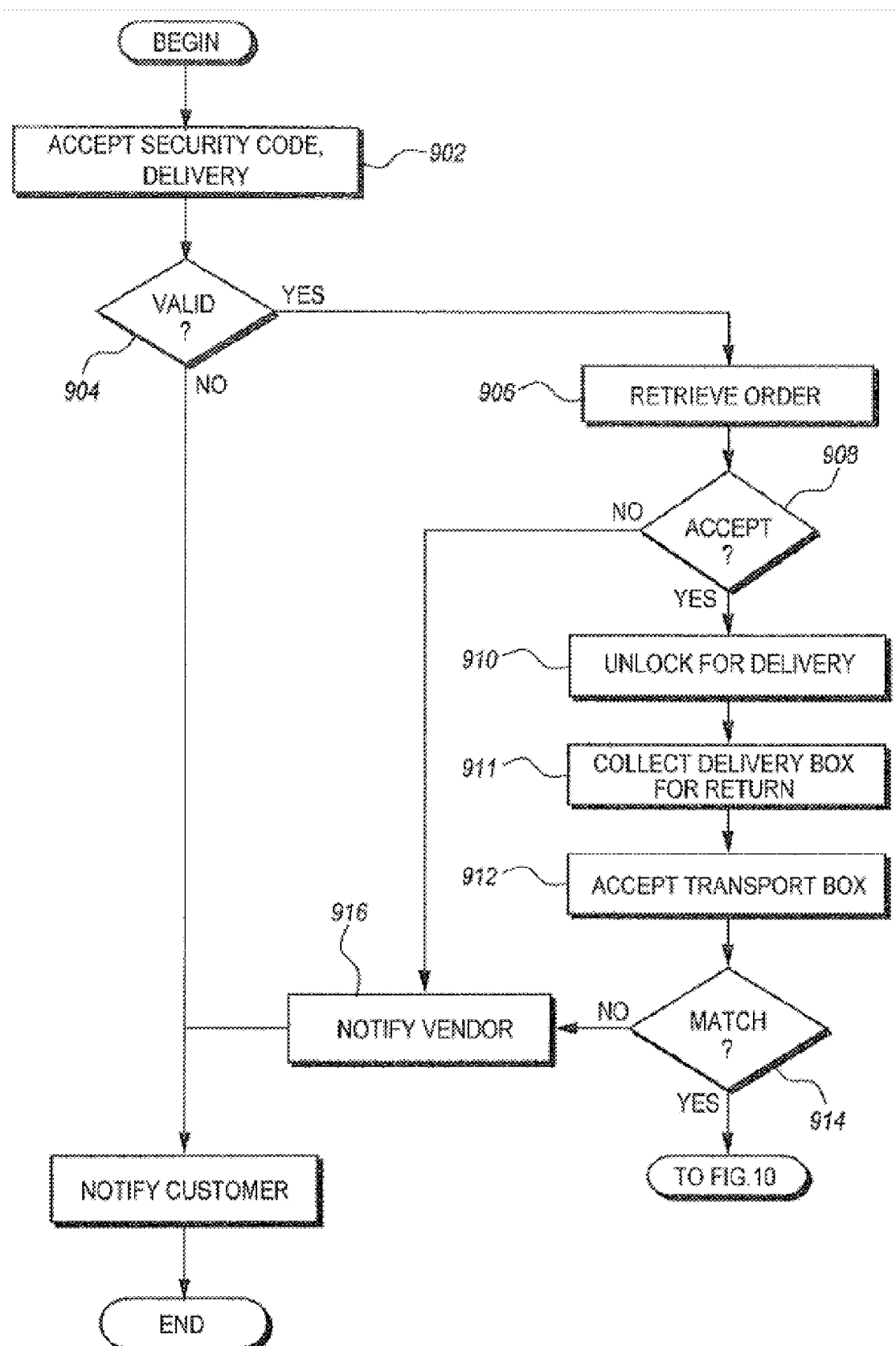
FIG. 9 representatively illustrates a first method of completing a delivery in accordance with an exemplary embodiment of the present technology.
Figure 10:
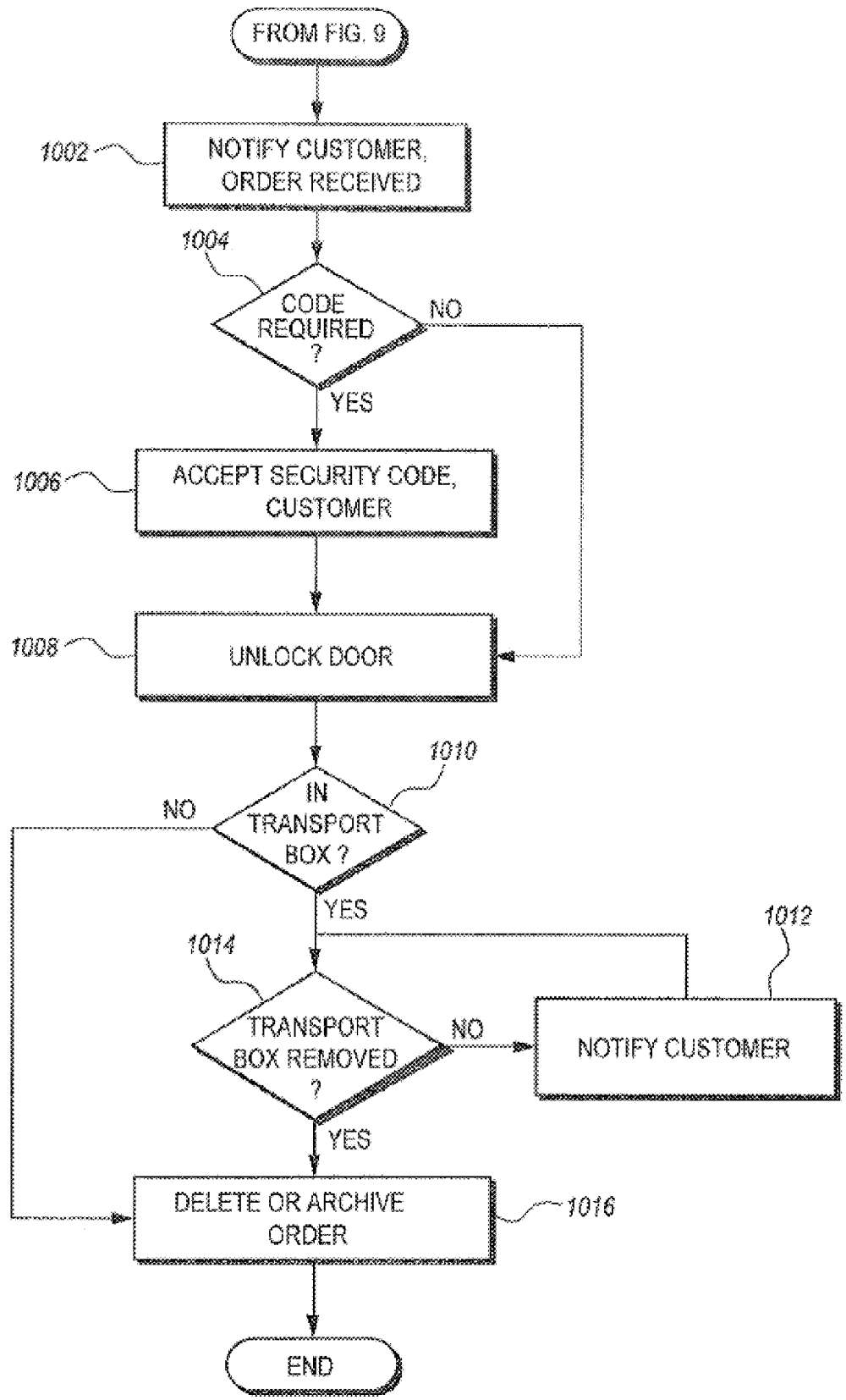
FIG. 10 representatively illustrates an alternative method of completing a delivery in accordance with an exemplary embodiment of the present technology.

Now referring to FIGS. 9 and 10, in one embodiment, granting access to the delivery box 100 may comprise first authenticating and/or authorizing the unlock (security/access) code (902). If the unlock code is not a valid code (904), the delivery box controller circuit 150 may be configured to not activate and/or otherwise prevent the electronic lock 104 from granting access to the first receiving section 120 of the delivery box 100. Instead, in the event of a wrong and/or unauthorized code entry, a notification may be generated to alert the customer that an unauthorized or unexpected attempt to open the delivery box 100 was made (918).

If a valid unlock code is used, the delivery box controller 150 may be configured to grant access to the first receiving section 120 so that the goods may be retrieved (906) along with any delivery instructions for the order. The order may be accepted or rejected (908) depending on whether or not the delivery of goods complies with the delivery instructions. For example, delivery instructions for an order may have specified a delivery deadline that has been missed. If the order is rejected, a notification may be sent to the vendor (or shipper) (916), and the customer may also be notified (918). If the order is accepted, the delivery box controller 150 may be configured to operate the electronic locks 104, 304 to open (910) and/or otherwise grant access to the first receiving section 120 of the delivery box 100.

If the goods to be delivered and/or transported are stored in a portable transport box 200, the portable transport box 200 may be placed into a transport box receptacle 122 (912) within the delivery box 100. In this manner, the transport box electrical contacts 208 may be configured to come into contact with the delivery box electrical contacts 124. Goods delivered and/or transported without a portable transport box 200 may be placed in the additional space 126 of the delivery box 100.

In one embodiment, positioning the portable transport box 200 into the transport box receptacle 122 may cause the transport box controller 250 of the portable transport box 200 to establish a communication link with the delivery box controller 150 of the delivery box 100. The set of delivery instructions stored in the portable transport box 200 may be compared against the set of delivery instructions stored in the delivery box 100 to verify that the correct order has been received. If there is a mismatch (914), an alert may be generated, and the vendor may be notified (916) and the customer may be notified (918).

Now referring to FIG. 10, the delivery box controller 150 may be configured to generate an alert to notify the customer of the delivery of the goods (1002). In one embodiment, the customer may be required to enter a security code to gain access to the goods within the delivery box 100. If the delivery box 100 only has a main door 102 for access, the customer may need to enter a code to unlock the main door 102. The code may be the same as the unlock code generated for the delivery or the customer may have a master code that will open the main door 102. Similarly, if a second door 110 is configured with a second electronic lock, a security code (which may be the same code or a different code) may be required for the customer to gain entry to the second door 110. If a security code is required (1004), the customer may enter the code, and the delivery box control 150 of the delivery box 100 may be configured to read the security code. If a valid code is entered, the delivery box controller 150 may be configured to grant access to the first receiving section 120 of the delivery box 100.

In one embodiment, if the goods are not in a portable transport box 200, the order and delivery instructions may be deleted and/or archived (1016) once access is granted to the first receiving section 120 of the delivery box 100. If the goods are contained within a portable transport box 200, the order and delivery instructions may be retained and/or otherwise stored until the portable transport box 200 is removed from its transport box receptacle 122. If the portable transport box 200 is not timely removed from the transport box receptacle 122 after access to the first receiving section 120 the delivery box 100 is granted (1014), a reminder may be generated to notify the customer (step 1012). Once the portable transport box 200 is removed, the order and delivery instructions may be deleted and/or archived (1016).

Figure 11:
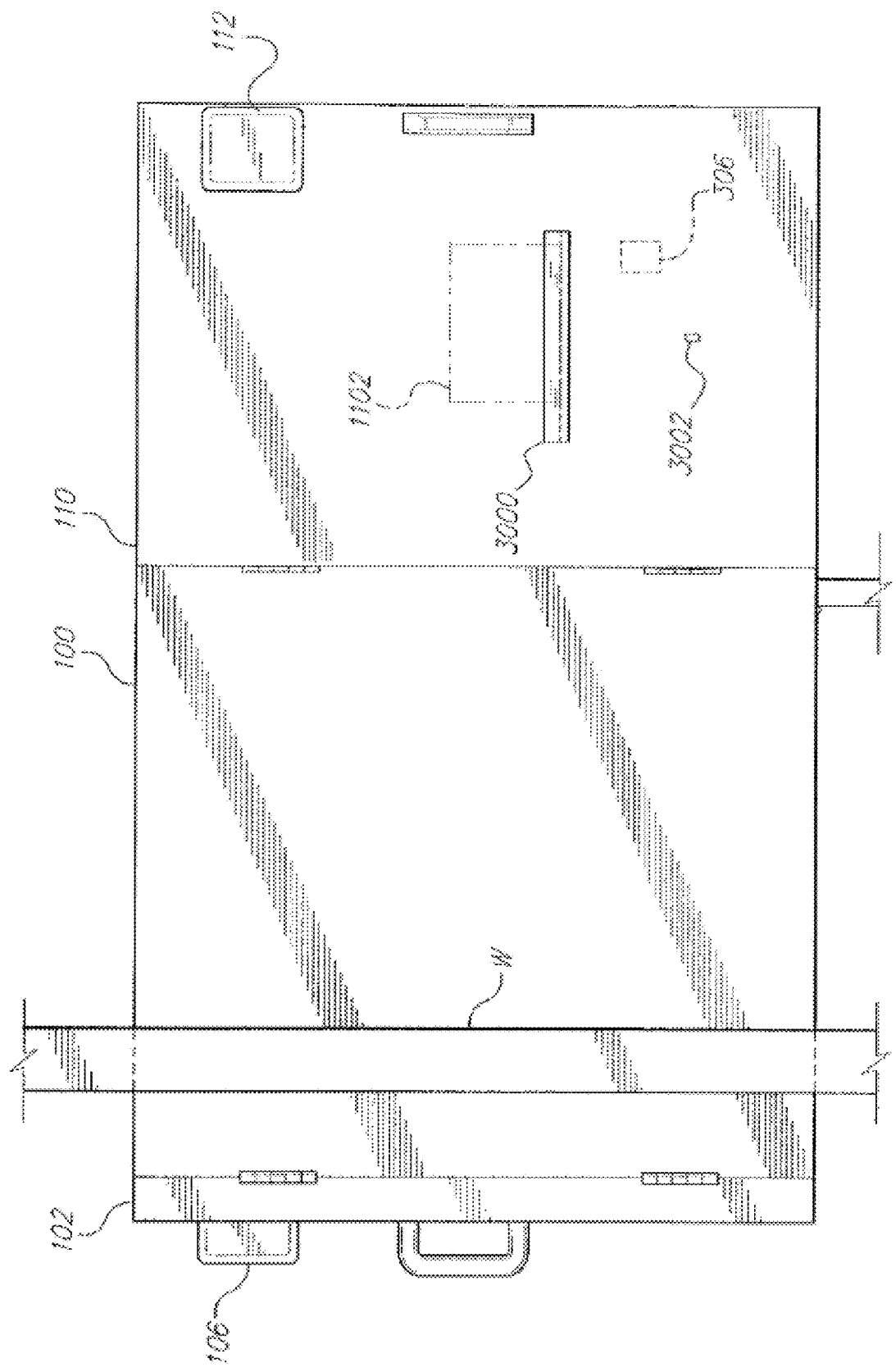
FIG. 11 representatively illustrates an alternative embodiment of the delivery box in accordance with an exemplary embodiment of the present technology.

Now referring to FIG. 11, in an alternative embodiment, a PC pluggable interface 3002 may be disposed on the inside of the second door 110 of the delivery box 100. The PC pluggable interface 3002 may be configured to communicatively link an electronic device with the delivery box 100. For example, the PC pluggable interface 3002 may be configured to link a cell phone, a tablet, a laptop, and/or the like to the delivery box 100. Once coupled to the PC pluggable interface, the electronic device may be configured to operate various components of the secure delivery system such as the heating device 258, the cooling device 256, the electronic locks 104, 304, the delivery box controller 150, the transport box controller 250, and/or the like. For example, the electronic device may be configured to lock and/or unlock the electronic locks 104, 304 via the PC pluggable interface 3002.

A slotted tablet attachment bar 3000 may be configured to be disposed on the second door 110 of the delivery box 100. The slotted tablet attachment bar 3000 may be configured such that a wireless tablet 1102 may be retained by the slotted tablet attachment bar 3000. The delivery box controller 150 may be configured to communicate with the tablet 1102. For example, the wireless tablet 1102 may be configured to send and receive instructions to and from the delivery box controller 150 to operate various components of the secure delivery system such as the heating device 258, the cooling device 256, the GPS receivers 252, 151, and or the like.

With particular reference now to FIGS. 13-16, the delivery box 100 may further comprise a second receiving section 1300 located within an interior of a second section 1302 of the delivery box 100. The second receiving section 1300 of the second section 1302 may comprise a completely separate receiving space from the first receiving section 120 such that the opening of the main door 102 will not provide access to the second receiving section 1300. Access to the second receiving section 1300, however, may still be possible through the second door 110. This arrangement allows an owner of the delivery box 100 to have simultaneous access to both the first and second receiving sections 120, 1300 while restricting access to the second receiving section 1300 from a delivery person.

Figure 14:
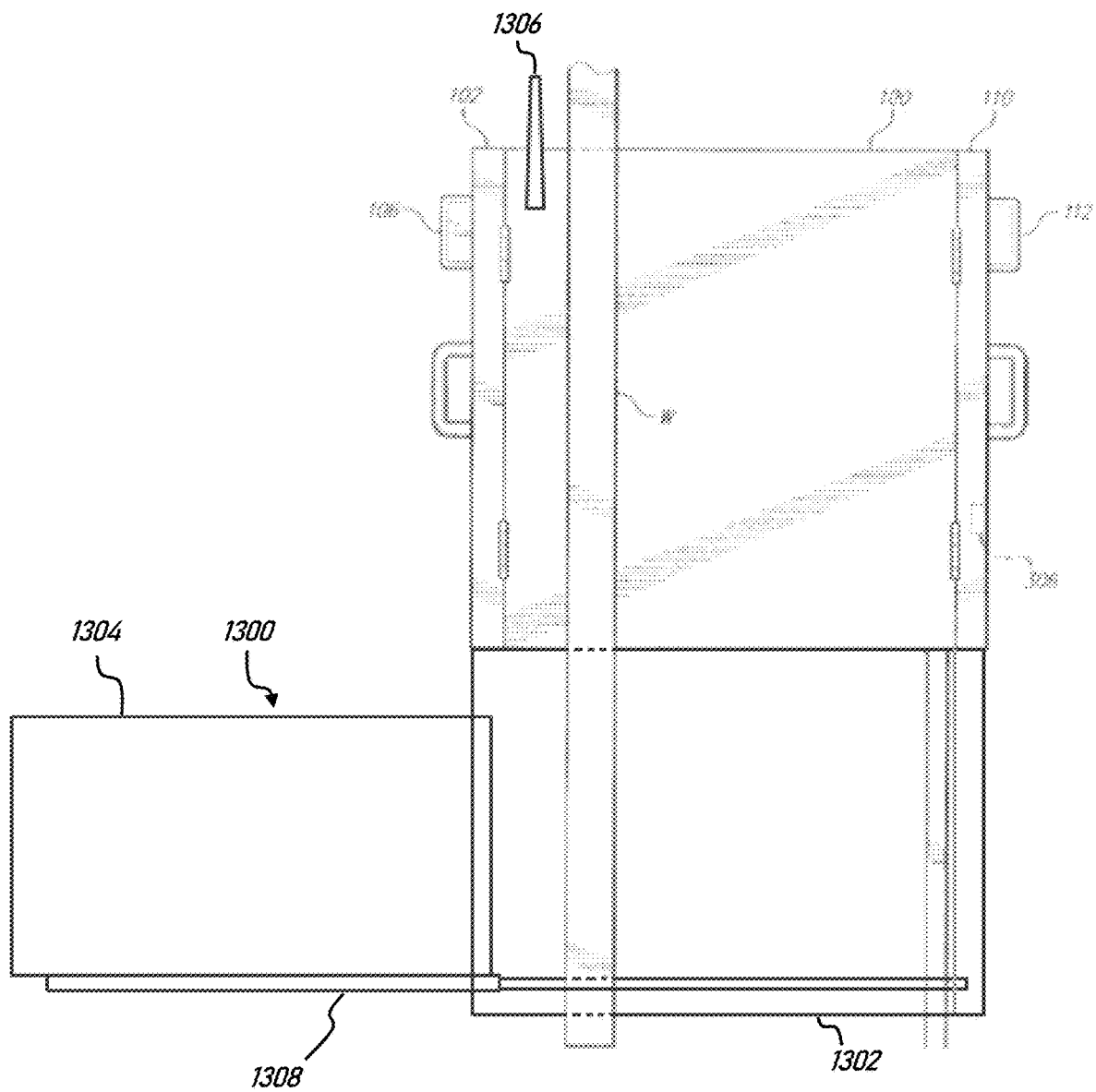
FIG. 14 representatively illustrates a side view of the delivery box with the extendible tray in an extended position in accordance with an exemplary embodiment of the present technology.
Figure 15:
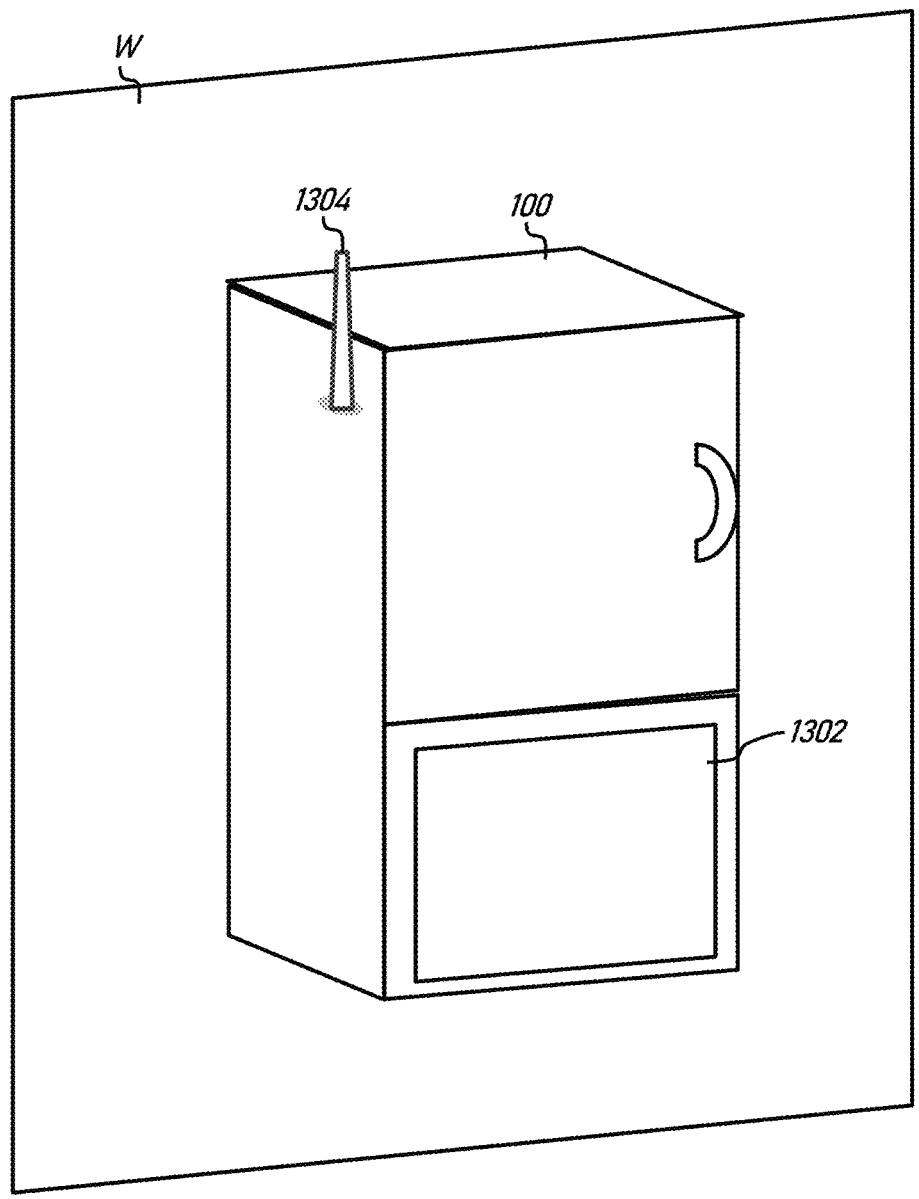
FIG. 15 representatively illustrates a front perspective view of the delivery box with the extendible tray in a retracted position in accordance with an exemplary embodiment of the present technology.
Figure 16:
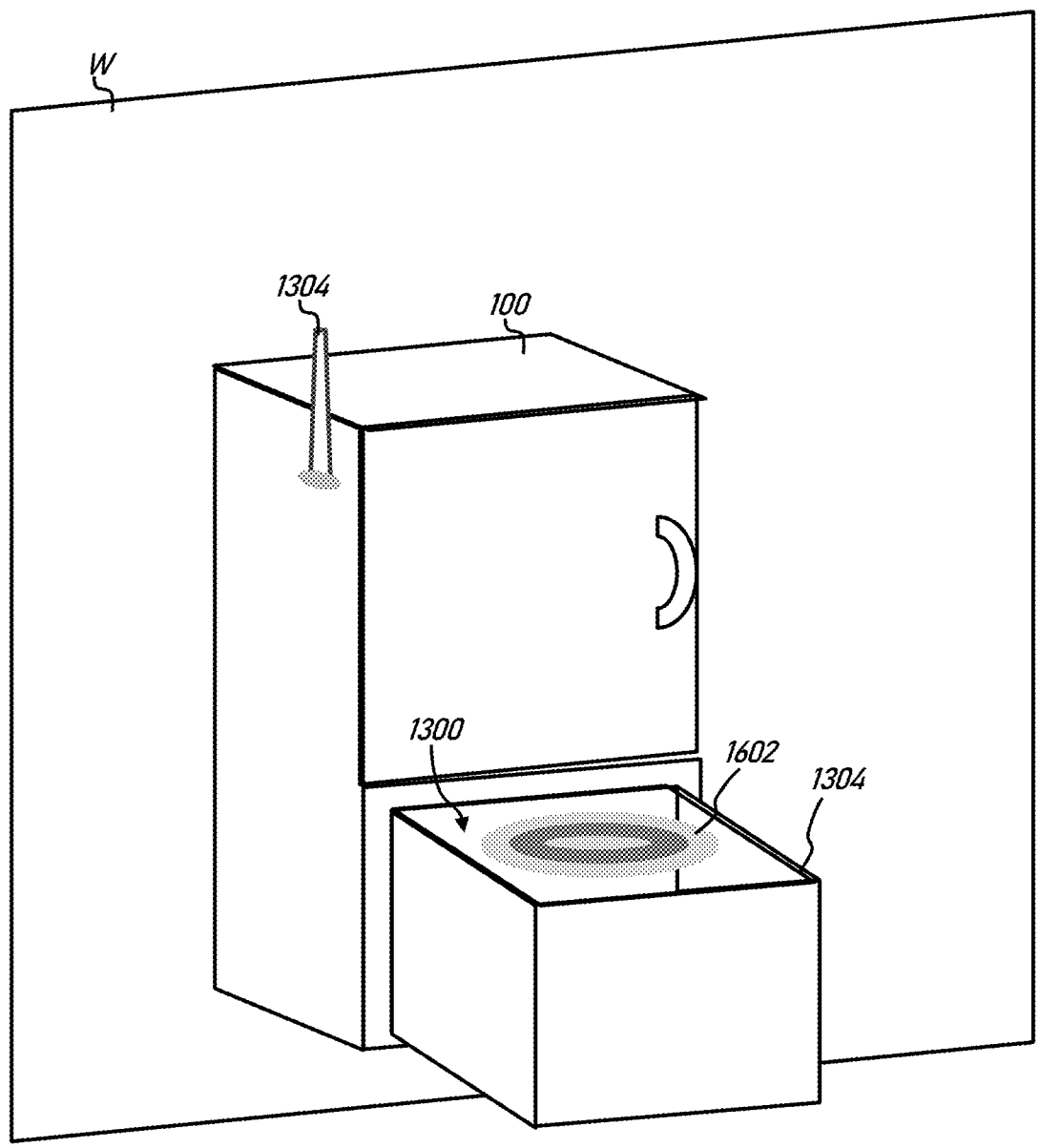
FIG. 16 representatively illustrates a front perspective view of the delivery box with the extendible tray in an extended position in accordance with an exemplary embodiment of the present technology.

Access to the second receiving section 1300 of the second section 1302 may be limited to autonomous delivery systems such as a drone or other automated unmanned delivery vehicle. The delivery box controller 150 may be configured to respond to communication signals from the autonomous delivery system and generate a second delivery signal when a delivery is being delivered by the autonomous delivery system. This signal may be communicated to the second receiving section causing the second section 1302 to take an action to allow the delivery to be deposited, or otherwise placed, into the second receiving section 1300. For example, in one embodiment, the second receiving section 1300 may comprise an extendible receiving tray 1304 that is configured to be moved between a retracted position (FIGS. 13 and 15) and an extended position (FIGS. 14 and 16). The extendible receiving tray 1304 may slide along a motorized rail 1308 between the retracted and extended positions.

The delivery box 100 may utilize an antenna system 1306 to receive and transmit signals between the autonomous delivery system and the delivery box controller 150. When the autonomous delivery system indicates that it is ready to delivery the item, it may transmit a signal to the delivery box controller 150 which in turn generates the second delivery signal causing the extendible tray 1304 to transition into the extended position.

To assist the autonomous delivery system properly identify the exact delivery location, the second receiving section 1300 may further comprise a top panel 1602 that is configured to provide a visual indicator that can be used by the autonomous delivery system as a target. For example, in one embodiment, the top panel 1602 may comprise a hinged lid having a surface treatment or design selected to distinguish the second receiving section 1300 from surrounding articles such as chairs, boxes, planters, or any other feature not associated with the delivery box 100. The surface treatment may comprise a target design along a top facing surface of the hinged lid that the autonomous delivery system may use to identify the location where the delivery is to be left. The hinged lid may be configured to pivot inwardly in response to the delivery being placed onto the target design thereby allowing the delivery to be positioned within the second receiving section 1300.

The extendible tray 1304 may be suitably configured to determine when the delivery has been made and then retract back into the delivery box 100. The determination of when to retract may be made by any suitable criteria such as a signal from the delivery box controller 150 that the delivery has been completed or in response to an indication that a weight corresponding to a weight for the delivery in the set of delivery instructions has been positioned within the second receiving section 1302.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A delivery system for an item ordered over a communication network, comprising:
 a portable transport box communicatively linked to the communication network and configured to receive and hold the ordered item within an interior space during a delivery process, wherein the portable transport box comprises:
  a portable transport box controller configured to receive a set of delivery instructions from the communication network; and
  an environmental control module in communication with the portable transport box controller and configured to monitor and adjust an interior temperature of the interior space of the portable transport box according to the set of delivery instructions during the delivery process; and
 a delivery box comprising:
  a delivery box controller configured to communicate with the portable transport box over the communication network and generate:
   a first delivery signal when the portable transport box is being delivered by a delivery person; and
   a second delivery signal when the portable transport box is being delivered by an autonomous delivery system;
  a delivery box location module in communication with the delivery box controller and configured to communicate a geographic location of the delivery box;
  a first receiving section, comprising:
   a main door providing access to the first receiving section;
   an electronic lock disposed on the main door and configured to unlock the main door in response to the first delivery signal; and
   a transport box receptacle disposed within the first receiving section and configured to engage the portable transport box to provide electrical power to the portable transport box; and
  a second receiving section, comprising an extendible receiving tray responsive to the delivery box controller wherein the extendible receiving tray is configured to extend outwardly in response to the second delivery signal to provide access to the second receiving section.

2. The delivery system according to claim 1, wherein the transport box receptacle is configured to form a communication link between the portable transport box controller and the delivery box controller.

3. The delivery system according to claim 1, wherein the environmental control module comprises:

a heating device configured to increase the ambient temperature of the interior space of the portable transport box; and a cooling device configured to decrease the ambient temperature of the interior space of the portable transport box.

4. The delivery system according to claim 1, wherein the set of delivery instructions comprises:

the delivery address based on a current location of the delivery box;

a target temperature for the interior space of the portable transport box; and an unlock code for the electronic lock.

5. The delivery system according to claim 4, wherein the portable transport box is configured to communicate the unlock code to the delivery box controller to generate the first delivery signal to unlock the electronic lock when the portable transport box is brought within a predetermined range of the delivery box.

6. The delivery system according to claim 4, wherein the unlock code comprises a randomly generated one-time code corresponding to a single delivery.

7. The delivery system according to claim 4, wherein the first delivery signal is generated after the delivery person enters the unlock code into the delivery box controller.

8. The delivery system according to claim 4, wherein a new geographic location of the delivery box is generated if the delivery box is moved to a new location.

9. The delivery system according to claim 1, wherein the delivery box further comprises a second door disposed on an opposing side of the deliver box as the main door.

10. The delivery system according to claim 1, wherein the main door further comprises:

a motion sensor in communication with the delivery box controller; and a video camera in communication with the delivery box controller.

11. The delivery system according to claim 1, wherein the extendible tray comprises a pivoting top panel having a surface configured to provide a visual indicator of an exact location of where the autonomous delivery system is to deliver the item.

12. The delivery system according to claim 1, wherein the extendible tray is further configured to retract back into the delivery box after the item has been delivered by the autonomous delivery system.

* * * * *